US010249201B2

(12) United States Patent
Spinelli

(10) Patent No.: US 10,249,201 B2
(45) Date of Patent: *Apr. 2, 2019

(54) ALTERNATIVE COMMUNICATIONS FOR AN AIR VEHICLE

(71) Applicant: The Boeing Company, Chicago, IL (US)

(72) Inventor: Charles B. Spinelli, Bainbridge Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,543

(22) Filed: Feb. 15, 2017

(65) Prior Publication Data
US 2017/0154538 A1 Jun. 1, 2017

Related U.S. Application Data

(63) Continuation of application No. 13/037,297, filed on Feb. 28, 2011, now Pat. No. 9,766,337.

(51) Int. Cl.
G08G 5/00 (2006.01)
G01S 19/01 (2010.01)
(Continued)

(52) U.S. Cl.
CPC ............ *G08G 5/0069* (2013.01); *G01S 19/01* (2013.01); *G01S 19/13* (2013.01); *G08G 5/0004* (2013.01);
(Continued)

(58) Field of Classification Search
USPC ...................................................... 701/1–18
See application file for complete search history.

(56) References Cited

U.S. PATENT DOCUMENTS 5,153,598 A * 10/1992 Alves, Jr. ................ G01S 19/25
342/352
5,714,948 A * 2/1998 Farmakis ............ B60R 25/1025
340/961
(Continued)

FOREIGN PATENT DOCUMENTS

CN 101868923 10/2010
CN 101960502 1/2011
(Continued)

OTHER PUBLICATIONS

The State Intellectual Property Office of China, "First Office Action," issued in connection with Chinese patent application No. 2012100339793, dated Mar. 12, 2015, 22 pages (includes English translation).
(Continued)

*Primary Examiner* — Jonathan L Sample
(74) *Attorney, Agent, or Firm* — Hanley, Flight and Zimmerman, LLC

(57) ABSTRACT

An example air vehicle includes a transponder to transmit a code indicative of a communications systems failure on the air vehicle. The example air vehicle includes a satellite receiver to receive, after the transponder code has been transmitted, a message from a satellite in communication with the air vehicle. The satellite receiver is to identify the message as including a command for the air vehicle and decode the message to determine the command. The example air vehicle includes a processor to execute the command.

18 Claims, 4 Drawing Sheets

(51) Int. Cl.
*G01S 19/13* (2010.01)
*H04B 7/185* (2006.01)
*H04L 29/08* (2006.01)

(52) U.S. Cl.
CPC ....... *G08G 5/0021* (2013.01); *H04B 7/18506* (2013.01); *H04B 7/18508* (2013.01); *H04L 67/12* (2013.01)

(56) References Cited

U.S. PATENT DOCUMENTS

| | | | | |
|---|---|---|---|---|
| 5,721,783 | A * | 2/1998 | Anderson | H04B 1/385 381/312 |
| 5,757,916 | A * | 5/1998 | MacDoran | G01S 19/215 342/357.48 |
| 5,793,813 | A * | 8/1998 | Cleave | H04B 7/18567 342/352 |
| 6,498,968 | B1 * | 12/2002 | Bush | G05B 13/048 701/1 |
| 6,641,087 | B1 * | 11/2003 | Nelson | B64D 45/0015 244/118.5 |
| 6,842,672 | B1 * | 1/2005 | Straub | G05D 1/0077 244/1 R |
| 6,963,292 | B1 * | 11/2005 | White | B64D 45/0015 340/426.12 |
| 6,985,801 | B1 * | 1/2006 | Straub | G01C 23/00 244/1 R |
| 7,064,681 | B2 * | 6/2006 | Horstemeyer | B60R 25/102 340/994 |
| 7,184,744 | B1 * | 2/2007 | Schnabel | G01S 19/02 340/539.13 |
| 7,225,981 | B2 * | 6/2007 | Jongebloed | G06Q 10/06 235/385 |
| 7,747,364 | B2 * | 6/2010 | Roy | G05D 1/0044 244/158.1 |
| 8,326,282 | B2 | 12/2012 | Margis | |
| 8,498,803 | B2 | 7/2013 | Blomenhofer et al. | |
| 9,753,143 | B2 * | 9/2017 | Bianchi | G01S 19/18 |
| 9,766,337 | B2 | 9/2017 | Spinelli | |
| 2002/0107694 | A1 * | 8/2002 | Lerg | B60C 23/06 704/273 |
| 2002/0133294 | A1 * | 9/2002 | Farmakis | B60R 25/102 701/301 |
| 2003/0093187 | A1 * | 5/2003 | Walker | B64C 13/20 701/1 |
| 2003/0130770 | A1 * | 7/2003 | Matos | G08G 5/0056 701/3 |
| 2003/0200026 | A1 * | 10/2003 | Pearson | G06F 8/65 701/301 |
| 2005/0031016 | A1 * | 2/2005 | Rosen | H04B 1/69 375/130 |
| 2006/0106506 | A1 * | 5/2006 | Nichols | G05D 1/101 701/3 |
| 2007/0050100 | A1 * | 3/2007 | Gustafson | B64D 45/0015 701/3 |
| 2007/0129855 | A1 * | 6/2007 | Coulmeau | G08G 5/0039 701/3 |
| 2008/0033604 | A1 * | 2/2008 | Margolin | G05D 1/0044 701/2 |
| 2008/0215204 | A1 * | 9/2008 | Roy | G05D 1/0044 701/28 |
| 2008/0284647 | A1 | 11/2008 | Oren et al. | |
| 2009/0102711 | A1 * | 4/2009 | Elwell, Jr. | G01S 5/0252 342/357.52 |
| 2009/0119002 | A1 * | 5/2009 | Krueger | G01S 19/13 701/532 |
| 2009/0219976 | A1 * | 9/2009 | Oren | G01S 19/14 375/141 |
| 2009/0316755 | A1 * | 12/2009 | Collette | G05D 1/0044 375/133 |
| 2010/0087980 | A1 * | 4/2010 | Spura | G05D 1/0022 701/24 |
| 2010/0250022 | A1 * | 9/2010 | Hines | G05D 1/101 701/2 |
| 2010/0292871 | A1 * | 11/2010 | Schultz | G01C 21/00 701/3 |
| 2010/0315281 | A1 * | 12/2010 | Askelson | G01S 7/003 342/30 |
| 2011/0035149 | A1 * | 2/2011 | McAndrew | G05D 1/0038 701/466 |
| 2011/0130636 | A1 * | 6/2011 | Daniel | G08B 25/016 600/301 |
| 2011/0169943 | A1 * | 7/2011 | Bachman, II | G06K 9/209 348/117 |
| 2011/0240792 | A1 * | 10/2011 | Oren | G01S 19/18 244/3.19 |
| 2011/0245996 | A1 * | 10/2011 | Orsulak | G05D 1/0011 701/2 |
| 2012/0221175 | A1 | 8/2012 | Spinelli | |
| 2012/0235863 | A1 * | 9/2012 | Erdos | H01Q 3/00 342/359 |
| 2013/0085981 | A1 * | 4/2013 | Fuciarelli | G06N 5/02 706/52 |
| 2016/0299231 | A1 * | 10/2016 | Bianchi | G01S 19/18 |

FOREIGN PATENT DOCUMENTS

| | | |
|---|---|---|
| CN | 101963806 | 2/2011 |
| WO | 02086658 | 10/2002 |
| WO | 2008097651 | 8/2008 |

OTHER PUBLICATIONS

European Patent Office, "Extended European Search Report," issued in connection with European patent application No. 12157388.5, dated Jan. 7, 2013, 5 pages.

European Patent Office, "Communication Pursuant to Article 94(3) EPC," issued in connection with European patent application No. 12157388.5, dated Dec. 19, 2013, 4 pages.

European Patent Office, "Invitation Pursuant to Article 94(3) and Rule 71 (1) EPC," issued in connection with European patent application No. 12157388.5, dated Oct. 31, 2014, 4 pages.

Japanese Patent Office, "Notification of Reasons for Refusal," issued in connection with Japanese patent application No. 2012-035727, dated Mar. 2, 2016, 4 pages (includes English translation).

Matthew DeGarmo and Gregory M. Nelson, "Prospective Unmanned Aerial Vehicle Operations in the Future National Airspace System," American Institute of Aeronautics and Astronautics, Sep. 2004, available at https://www.mitre.org/publications/technical-papers/prospective-unmanned-aerial-vehicle-operations-in-the-future-national-airspace-system (last accessed Feb. 23, 2017), 8 pages.

"Project on Unmanned Aircraft in the NAS, Final Review Panel Meeting," Carnegie Mellon, May 1, 2007, available at http://www.andrew.com.edu/course/19-451/CMU_UAS_Final_Presentation.ppt (last accessed Feb. 23, 2017), 83 pages.

"UAS in the NAS," Aviation Today, Jun. 14, 2010, 2 pages.

Gerald R. Sayer, "Operation of UAS in the Non-Segregated NAS," 2009/2010 UAS Yearbook—UAS: The Global Perspective, 7th Edition, Jun. 2009, pp. 121-123, 3 pages.

United States Patent and Trademark Office, "Non-final Office Action," issued in connection with U.S. Appl. No. 13/037,297, dated Jun. 16, 2015, 28 pages.

United States Patent and Trademark Office, "Final Office Action," issued in connection with U.S. Appl. No. 13/037,297, dated Feb. 1, 2016, 27 pages.

United States Patent and Trademark Office, "Notice of Allowance," issued in connection with U.S. Appl. No. 13/037,297, dated Nov. 15, 2016, 8 pages.

United States Patent and Trademark Office, "Non-final Office Action," issued in connection with U.S. Appl. No. 13/037,297, dated Mar. 28, 2013, 21 pages.

United States Patent and Trademark Office, "Final Office Action," issued in connection with U.S. Appl. No. 13/037,297, dated Aug. 2, 2013, 16 pages.

(56) References Cited

OTHER PUBLICATIONS

United States Patent and Trademark Office, "Non-final Office Action," issued in connection with U.S. Appl. No. 13/037,297, dated Jun. 6, 2014, 19 pages.

United States Patent and Trademark Office, "Final Office Action," issued in connection with U.S. Appl. No. 13/037,297, dated Sep. 29, 2014, 19 pages.

* cited by examiner

ALTERNATIVE COMMUNICATIONS FOR AN AIR VEHICLE

RELATED APPLICATION

This patent arises from a continuation of U.S. patent application Ser. No. 13/037,297, (now U.S. Pat. No. 9,766, 337), titled "Alternative Communications for an Air Vehicle," and filed on Feb. 28, 2011. U.S. patent application Ser. No. 13/037,297 is hereby incorporated herein by reference in its entirety.

BACKGROUND

In the past, unmanned air vehicles (UAVs) mainly supported military and security operations. Now, however, these remotely operated vehicles have additional uses, such as border patrol, disaster relief, traffic reporting, aerial photography, and environmental surveys.

With these additional uses, the UAVs share the National Airspace System (NAS) with commercial aircraft and other manned vehicles. UAV flight operations may be granted by the Federal Aviation Administration (FAA).

When manned aircraft are flying in the National Airspace System, they are required to retain the ability communicate with the FAA at all times. If a manned aircraft loses two-way radio communications, its transponder broadcasts squawk code 7600, which notifies air traffic control (ATC) that communications has been lost, and its pilot follows FAA regulations to safely land the aircraft (see, e.g., 14 CFR 91.185).

UAVs do not have these same capabilities as manned vehicles. If the communications system of a UAV fails, the UAV will be unreachable and, consequently, might enter restricted airspace.

The FAA is concerned about the consequences of UAVs that lose radio communications. The ability to re-establish communications with UAVs is needed.

SUMMARY

An example air vehicle includes a transponder to transmit a code indicative of a communications systems failure on the air vehicle. The example air vehicle includes a satellite receiver to receive, after the transponder code has been transmitted, a message from a satellite in communication with the air vehicle. The satellite receiver is to identify the message as including a command for the air vehicle and decode the message to determine the command. The example air vehicle includes a processor to execute the command.

An example method for re-establishing communication with an air vehicle after a communications system failure on the air vehicle includes receiving an indication of the communications system failure and generating an instruction for the air vehicle including a course of action to be taken by the air vehicle. The example method includes transmitting the instruction to a satellite receiver of the air vehicle via a satellite in communication with the air vehicle.

An example vehicle includes means for providing an indication of a communications system failure on the vehicle. The example vehicle includes means for receiving a message from a satellite in communication with the vehicle. The means for receiving the message is to receive the message after the providing of the indication of the communications system failure by the means for providing. The means for receiving the message is to decode the message to determine a course of action for the vehicle. The example vehicle includes means for executing the course of action.

DETAILED DESCRIPTION

Figure 1:
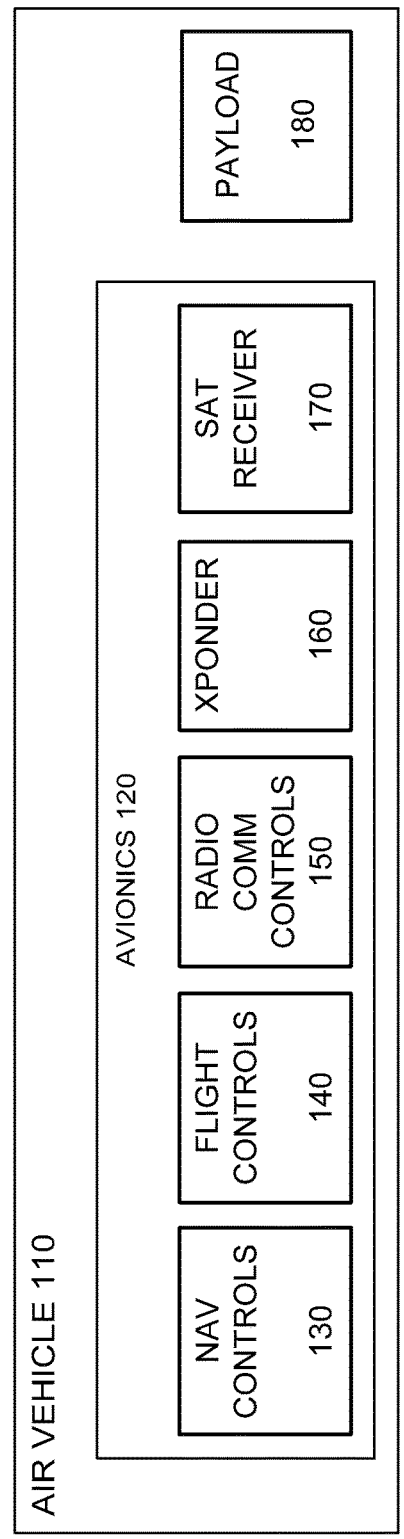
FIG. 1 is an illustration of an air vehicle.

Reference is made to FIG. 1, which illustrates an air vehicle 110. The air vehicle 110 includes an avionics system 120 that performs various functions and includes, but is not limited to, navigation controls 130, flight controls 140, radio communication controls 150, a transponder 160, and a satellite receiver 170 having messaging capability. The functions performed by these components may be implemented in standalone hardware, or several of these functions may be integrated into hardware systems. As a first example, the satellite receiver 170, navigation controls 130 and flight controls 140 may be integrated into a single navigation and flight controls system. As a second example, the radio communication controls 150 and transponder 160 may be integrated into a communications system.

The air vehicle 110 may or may not include a propulsion system. The air vehicle 110 may be a manned vehicle (e.g., a commercial aircraft, a commuter aircraft, or General Aviation aircraft) or an unmanned air vehicle (e.g., an aircraft, or balloon). If the air vehicle 110 is unmanned, the navigation controls 130 and flight controls 140 may be part of an automated navigation and flight controls system.

Figure 2:
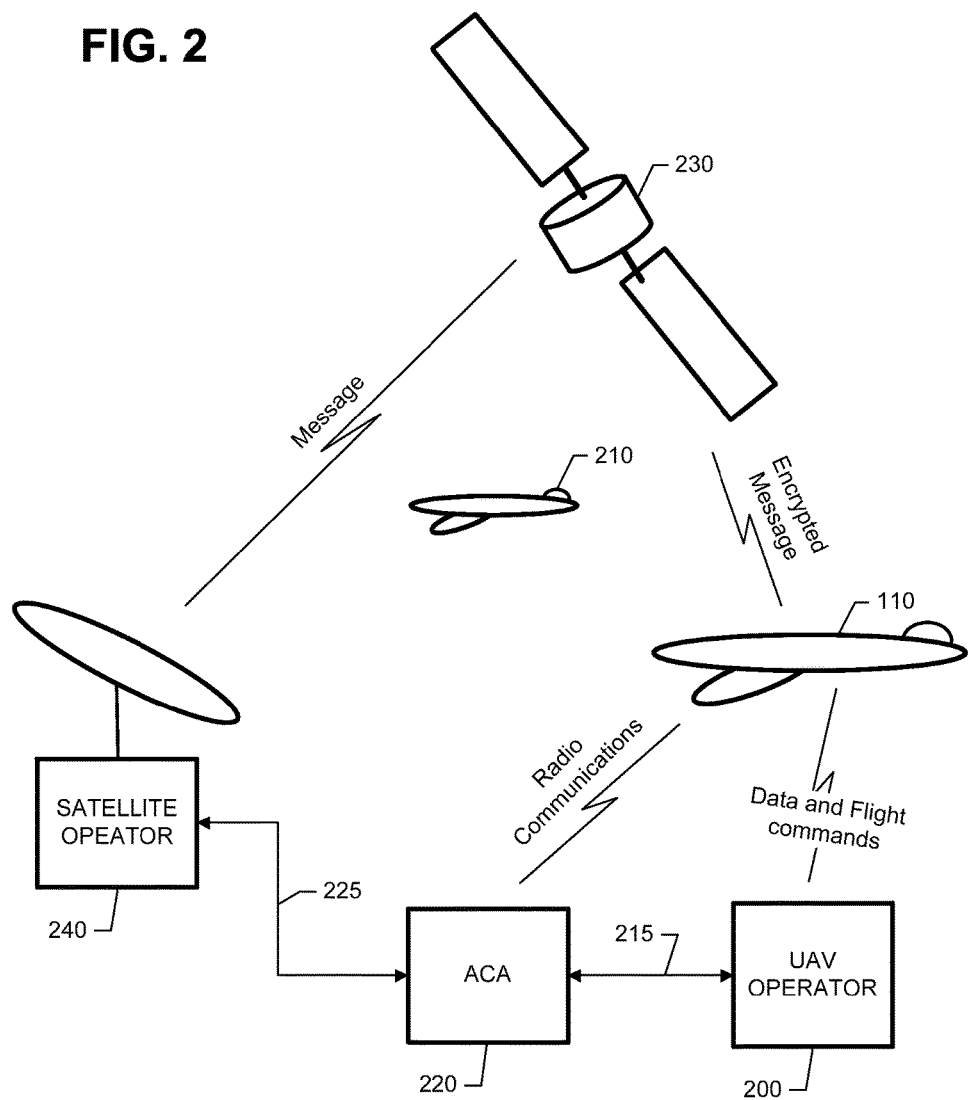
FIG. 2 is an illustration of an unmanned air vehicle in an airspace.

Additional reference is made to FIG. 2, which shows an unmanned air vehicle (UAV) 110 flying in an airspace. The UAV 110 is controlled remotely by a ground or airborne UAV operator 200. The UAV flight controls 140 respond to flight commands from the UAV operator 200, and a payload 180 may send data back to the UAV operator 200.

The flight of the UAV 110 is monitored by an Airspace Control Administrator (ACA). In the United States, for example, the ACA may be a governmental agency such as the FAA, or it may be a non-governmental agency. The UAV radio communication controls 150 maintain two-way radio communications with the ACA 220. The ACA 220 also monitors other air vehicles 210 sharing the airspace.

The UAV satellite receiver 170 communicates with one or more satellites 230. For instance, a Global Positioning System (GPS) receiver 170 receives signals from several GPS satellites 230 to determine the precise position of the UAV 110 in airspace. The GPS receiver 170 also has messaging capability. A text code field allows the GPS receiver 170 to receive and display satellite status information. This is the conventional use of the messaging capability.

The messaging capability of the GPS receiver 170 has another use: the text code field is used to re-establish communications with the ACA 220 in the event alternative communications is required. Alternative communications might be required in the event of two-way radio communications failure between the UAV 110 and the ACA 220 or between the UAV operator 200 and the UAV 110. Such failure might result, for instance, from a primary communications system failure, line-of-sight restrictions, or jamming of a primary communications link.

There are various ways in which the ACA 220 may determine that alternative communications are required. As a first example, the UAV transponder 160 transmits a discrete code (e.g., 7200) signaling that two-way communications has been lost. As a second example, the ACA 220 suddenly loses communications with the UAV 110. As a third example, the UAV operator 200 informs the ACA 220 FAA (e.g., via the link 215) that UAV communications are unavailable.

Figure 3:
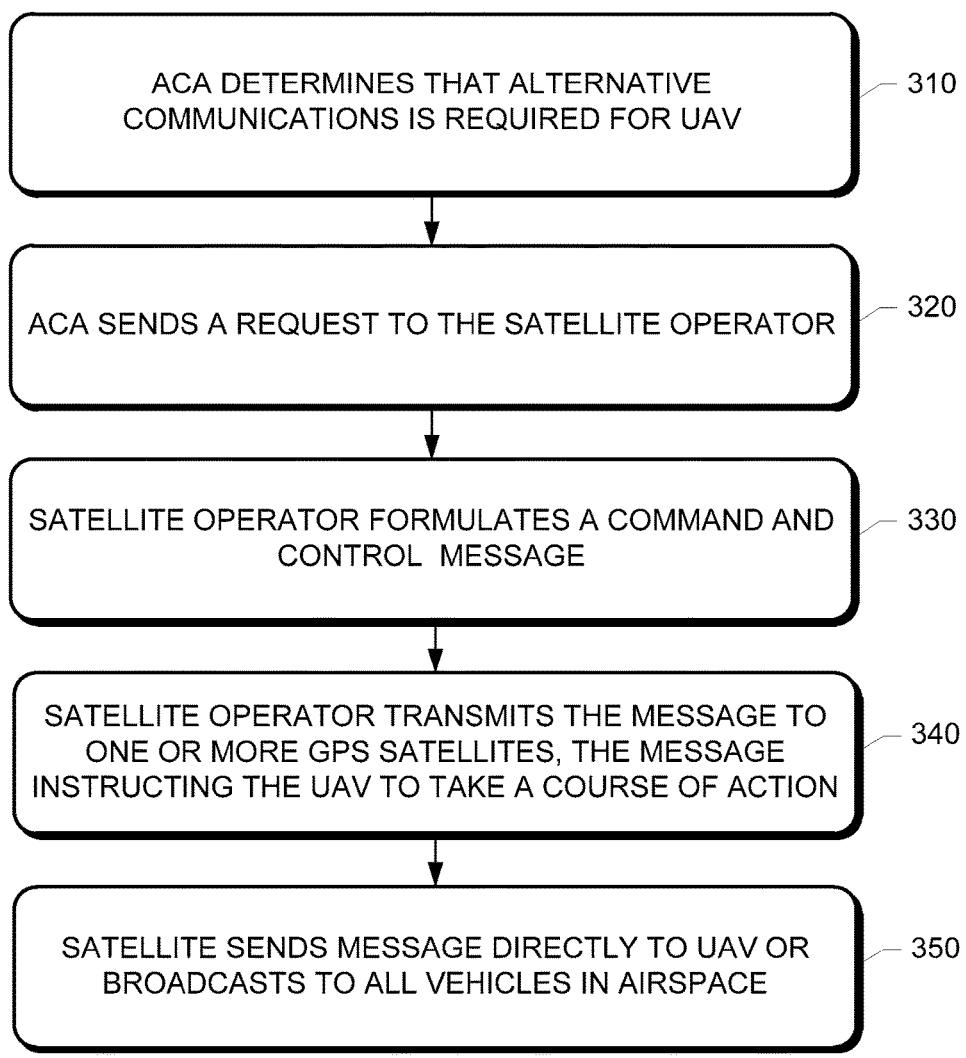
FIG. 3 is an illustration of an alternative communications method performed by an Airspace Control Administrator and a satellite operator.

Additional reference is made to FIG. 3. When the ACA 220 determines that alternative communications are required for the UAV 110 (block 310), it attempts to re-establish communications with the UAV 110 by having a command and control (C2) message sent to the GPS receiver 170, where the C2 message instructs the UAV 110 to take a course of action (blocks 320-350). As a first example, the C2 message specifies a longitude and latitude, and instructs the UAV 110 to fly to that specific location (for instance, where it lands or runs out of fuel). As a second example, the C2 message instructs the UAV 110 to return to its starting location. As a third example, the C2 message instructs the UAV to leave restricted airspace. As a forth example, the C2 message instructs the UAV 110 to self destruct.

The ACA 220 may have the C2 message sent as follows. At block 320, the ACA 220 sends a request to the satellite operator 240 (e.g., via link 225). The request will specify the course of action for the UAV 110.

At block 330, the satellite operator 240 formulates a C2 message. The C2 message might include an identification field and an instructions field. The satellite operator 240 might formulate the C2 message by filling these fields with a code identifying the message as a C2 message and another code corresponding to a specific course of action.

At block 340, the satellite operator 240 transmits the C2 message to one or more satellites 230. At block 350, the satellite 230, in turn, sends the C2 message to the GPS receiver 170 of the UAV 110. The satellite 230 may send the C2 message directly to the UAV 110. In the alternative, the satellite 230 may broadcast the C2 message to all air vehicles 110 and 210 in the airspace. However, the C2 message may be read only by the UAV 110. For instance, the message may be encrypted and may only be decrypted by the air vehicle having a corresponding decryption key and the correct ID.

It may take as little as 0.5 seconds to transmit the C2 message to the GPS satellite 230, receive the C2 message at the GPS receiver 170 onboard the UAV 110, and decode the C2 message. More time may be taken if the C2 message is sent synchronously (e.g., every X seconds) instead of asynchronously (e.g., upon receipt of a request).

Figure 4:
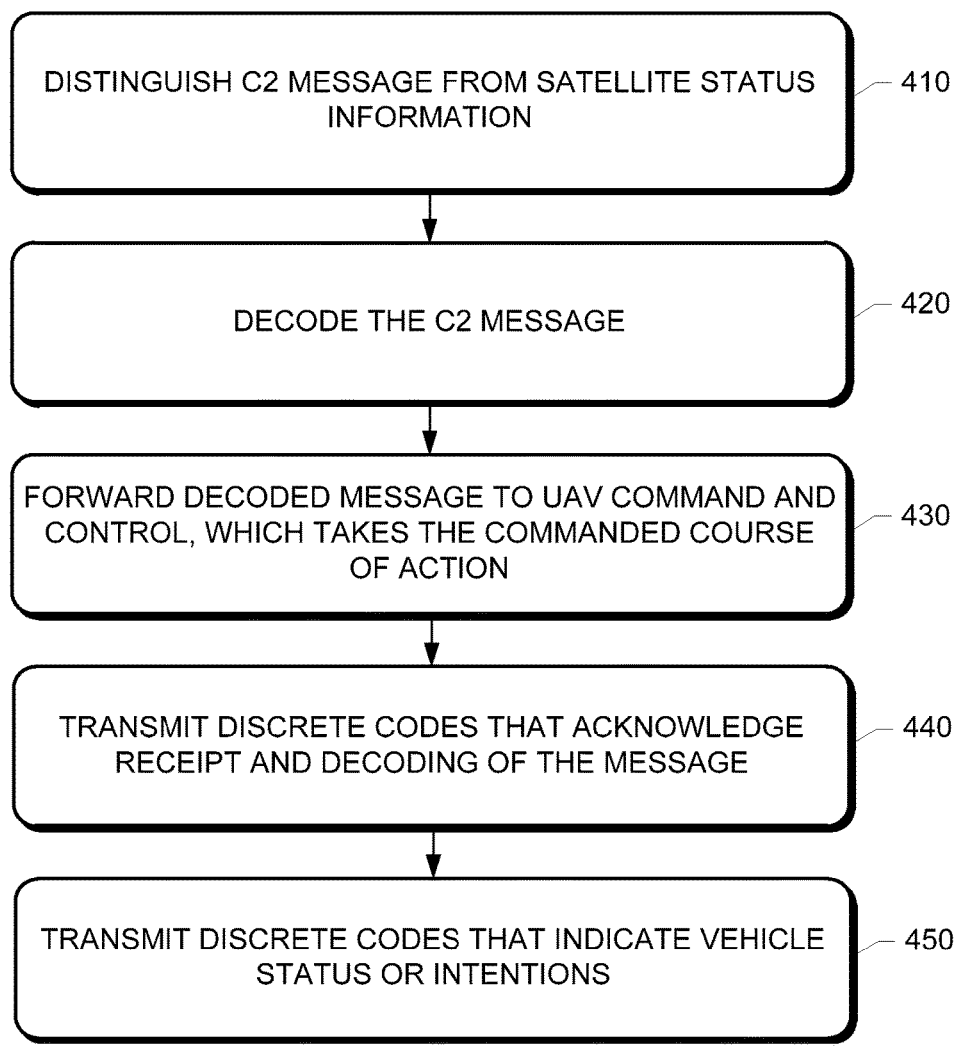
FIG. 4 is an illustration of an alternative communications method performed by an air vehicle.

Additional reference is made to FIG. 4, which illustrates the response by the UAV 110. At block 410, the satellite receiver 170 distinguishes the C2 message from satellite status information by the type and format of the message that is sent. At block 420, the satellite receiver 170 decodes the C2 message to determine the commanded course of action. For example, the satellite receiver 170 uses a lookup table to look up a code in the appropriate field of the C2 message.

At block 430, the commanded course of action is forwarded to UAV Command and Control, which is the flight control system that performs navigation and control. The UAV Command and Control commands the UAV 110 to take the commanded course of action.

At block 440, the transponder 160 may transmit discrete codes that acknowledge receipt and decoding of the C2 message. For example, code 5601 may be used for such an acknowledgement. The transponder code may be received by the ACA 220.

At block 450, the transponder 160 may also transmit discrete transponder codes indicating vehicle intentions or status. The codes indicating status and intention may be updated periodically. The ACA 220 may override the vehicle intention by having another message sent to the satellite receiver 170.

If the UAV 110 is not broadcasting transponder codes, it may be necessary to determine the location of the UAV 110. Under these circumstances, the UAV 110 may be found via search. One method is to search "skin paint" with ACA active radars.

The avionics 120 of the UAV 110 may be microprocessor-based. Microprocessor-based avionics allow the flight controls 140, transponder 160, and satellite receiver 170 to be implemented via programming. Flight controls, transponders and GPS receivers in general are typically found in all air vehicles. Thus, the alternative communications herein may be implemented without adding extra hardware, thereby saving weight and cost.

Alternative communications herein are not limited to the embodiments above. A satellite receiver 170 other than a GPS receiver may be used to receive messages. As a first example, the satellite receiver 170 may be a Wide Area Augmentation System (WAAS)-capable GPS receiver. WAAS augments GPS by providing greater accuracy and integrity. A WASS receiver uses WAAS customizable data messages. Customizable messages are more flexible than GPS field codes because they enable more distinct commands to be sent (e.g., waypoints, landing sites, and velocity).

The satellite receiver 170 is not limited to positioning systems. The satellite receiver may communicate with a commercial satellite such as XM radio or Sirius radio. Messages may be sent through a service provider for each of these alternative satellite systems.

Alternative communications for manned and unmanned vehicles may be performed in the same basic way. A manned vehicle experiencing a communications failure may receive information from the ACA via its satellite receiver. For instance, the ACA may send a C2 message specifying waypoint information for a new flight path. The satellite receiver decodes the C2 message, and the avionics takes a course of action that includes displaying that information on a cockpit display so the pilot can fly the flight path ordered by the ACA.

What is claimed is:

1. An air vehicle comprising:
   a transponder to transmit a code indicative of a communications system failure on the air vehicle;
   a global positioning system (GPS) receiver to:
      receive, after the transponder code has been transmitted, a message from a GPS satellite in communication with the air vehicle;
      identify the message as including a command for the air vehicle; and
      decode the message to determine the command; and
   a processor to execute the command.

2. The air vehicle of claim 1, wherein the code is indicative of a failure of the communications system to communicate with an air vehicle controller.

3. The air vehicle of claim 1, wherein the command includes a flight path for the air vehicle, the processor to cause the flight path to be displayed via a display of the air vehicle.

4. The air vehicle of claim 1, wherein the command includes a location to which the air vehicle is to fly.

5. The air vehicle of claim 1, wherein the message is a first message, and wherein the GPS receiver is to distinguish the first message from a second message received by the GPS receiver from the GPS satellite based on respective formats of the first and second messages.

6. The air vehicle of claim 1, wherein the code is a first code, and wherein the transponder is to transmit a second code indicative of receipt of the message by the GPS receiver.

7. A method for re-establishing communication with an air vehicle after a communications system failure on the air vehicle, the method comprising:
receiving, via a processor, an indication of the communications system failure;
generating, by executing an instruction with the processor, an instruction for the air vehicle including a course of action to be taken by the air vehicle;
encrypting, by executing an instruction with the processor, the instruction into an encrypted message; and
reducing an amount of time to re-establish communication with the air vehicle by transmitting, by executing an instruction with the processor, the encrypted message to a satellite receiver of the air vehicle via a satellite in communication with the air vehicle.

8. The method of claim 7, wherein the instruction is a first instruction and further including:
receiving an indication of an intended course of action of the air vehicle;
generating a second instruction for the air vehicle to override the intended course of action; and
transmitting the second instruction to the satellite receiver via the satellite.

9. The method of claim 7, wherein the indication of the communications system failure includes a transponder code transmitted by the air vehicle, the transponder code indicative of a loss of two-way communication.

10. The method of claim 7, wherein the air vehicle is an unmanned air vehicle and the indication includes a communication from an operator of the unmanned air vehicle of a loss of communication with the unmanned air vehicle.

11. The method of claim 7, wherein generating the instruction includes providing an identifier to identify the instruction as a command message for the air vehicle.

12. The method of claim 7, further including sending the encrypted message to the air vehicle periodically after receipt of the indication of the communications system failure.

13. A vehicle comprising:
means for providing an indication of a communications system failure on the vehicle;
means for receiving an encrypted message from a global positioning system (GPS) satellite in communication with the vehicle, the means for receiving the encrypted message to receive the encrypted message after the providing of the indication of the communications system failure by the means for providing, the means for receiving the encrypted message to decode the encrypted message to determine a course of action for the vehicle; and
means for executing the course of action.

14. The vehicle of claim 13, wherein the means for providing the indication is a transponder.

15. The vehicle of claim 13, wherein the means for receiving the encrypted message is to distinguish the encrypted message from a second message received by the means for receiving from the GPS satellite, the second message including data other than the course of action.

16. The air vehicle of claim 1, wherein the communications system failure is indicative of a failure of a radio communication controller on the air vehicle.

17. The air vehicle of claim 1, wherein the message is broadcast by the GPS satellite, wherein the message is encrypted, and wherein the GPS receiver is to decrypt the message via a decryption key.

18. The method of claim 7, wherein the satellite receiver is a global positioning system (GPS) receiver and the satellite is a GPS satellite.

* * * * *